United States Patent [19]
McDaniel

[11] Patent Number: 5,191,912
[45] Date of Patent: Mar. 9, 1993

[54] LIQUID LEVEL CONTROLLER

[76] Inventor: Roy L. McDaniel, P.O. Box 141, Perryton, Tex. 79070

[21] Appl. No.: 819,485

[22] Filed: Jan. 10, 1992

[51] Int. Cl.$^5$ .............................................. F16K 31/34
[52] U.S. Cl. ...................... 137/413; 137/85; 137/270; 137/414; 137/416; 251/28
[58] Field of Search ........... 137/85, 101.25, 391, 137/397, 412, 413, 446, 390, 416; 251/28

[56] References Cited

U.S. PATENT DOCUMENTS

| | | | |
|---|---|---|---|
| 2,649,771 | 8/1953 | Parks | 137/413 |
| 2,653,623 | 9/1953 | Hippen et al. | 137/413 |
| 2,825,308 | 3/1958 | Klee | 121/46.5 |
| 2,853,093 | 9/1958 | Kuhles | 137/413 |
| 2,882,724 | 4/1959 | Smith | 73/200 |
| 3,088,485 | 5/1963 | Hanssen | 137/413 |
| 3,120,241 | 2/1964 | Parks | 137/413 |
| 3,433,245 | 3/1969 | Cymbalisty | 137/242 |
| 3,614,857 | 10/1971 | Fette | 55/219 |
| 3,840,044 | 10/1974 | Harris et al. | 137/413 |
| 3,860,028 | 1/1975 | Moore et al. | 137/413 |
| 3,970,099 | 7/1976 | Murphy, Jr. et al. | 137/101.25 |
| 4,304,528 | 12/1981 | Jordan | 417/208 |
| 4,436,109 | 3/1984 | Taylor | 137/413 |
| 4,505,288 | 3/1985 | Murphy, Jr. et al. | 137/59 |
| 4,543,973 | 10/1985 | Ho | 137/413 |
| 4,573,489 | 3/1986 | Carlton et al. | 137/59 |
| 4,700,738 | 10/1987 | Frese et al. | 137/413 |
| 4,781,894 | 11/1988 | Wheaton | 422/106 |

*Primary Examiner*—George L. Walton
*Attorney, Agent, or Firm*—Laney, Dougherty, Hessin & Beavers

[57] ABSTRACT

Liquid level control apparatus consisting of a valve frame with supply gas throughput through an adjustable orifice post and a float actuated release of orifice post pressure to cause a sharp change in pressure to actuate a pressure-responsive dump valve. Proposed then is the further interconnection of the valve frame in reversed disposition to a snap action pilot valve thereby to provide a non-bleeding mode of valve control.

5 Claims, 2 Drawing Sheets

LIQUID LEVEL CONTROLLER

BACKGROUND OF THE INVENTION

1. Field of the Invention

The invention relates generally to liquid level controllers of the type used for automatic level control in oil field applications and the like and, more particularly, but not by way of limitation, it relates to an improved liquid level controller that is pollution free as it does not bleed control gas into the atmosphere.

2. Description of the Prior Art

The prior art includes numerous types of float-operated and pressure-operated switching arrangements for controlling the liquid level in field storage tanks of various types, particularly those that are used in the petroleum industry. A series of floatless controllers for use on inlet gas scrubbers for compressors is available from Kimray, Inc. of Oklahoma City, Okla. and this series of valves is identified as Type 100, 200 and 400 PLC Floatless Controllers. This type of controller may be applied to any liquid level control application in conjunction with a diaphragm-type motor valve. The same manufacturer also provides a Type PFS series float-operated pilot valve for use on oil and gas separators, water knock-outs, gas scrubbers, accumulators and related devices.

U.S. Pat. No. 2,882,724 is representative of a prior art type of liquid level metering apparatus. This patent teaches free float liquid metering utilizing a metering vessel containing a float member that is free to move up and down the column vessel between movable arms. The movable arms are each positioned to operate actuating assemblies which function to open and close the fluid inlet valve to the vessel and the fluid outlet valve.

U.S. Pat. No. 3,970,099 is illustrative of another type of liquid level controller wherein a vent valve reacts to movement of a float suspended within a container or vessel. A pneumatic vent valve responds to float movement through a simplified direct-acting mechanism having a sealed shaft between the float and vent chambers. Here again, we have a pneumatic control system that is particularly adaptable for allowing a compressor to be shut down when liquid level reaches a predetermined height. However, the device is also adaptable for use with pressure vessels, boilers and the like. The U.S. Pat. No. 4,573,489 is directed to a dump valve which includes a float/float arm sensor within a gas scrubber container. The liquid level responsive float is connected to operate a vent valve which, in turn, is connected to a small diaphragm spool valve that feeds through a pressure regulator unit. A sensitive, small pneumatic signal-responsive diaphragm spool valve is utilized in parallel with the float-operated vent valve so that when the vent valve is open due to rising liquid level, a small pneumatic control signal is delivered through the spool valve to a pneumatic control chamber on one side of a relatively large diaphragm of an automatic dump valve. This dump valve enables quick, manual operation whenever desired as an override to the automatically responsive condition.

SUMMARY OF THE INVENTION

The present invention is an improved form of liquid level controller that is responsive to float position and can be powered by available wellhead gas in non-bleeding manner. A supply gas is derived from the local installation and applied to a control head which is open and closed in accordance with the level of a float. The orifice assembly is threadedly received within the control head to place an axial orifice in position for closure by the float snubber while also having a pair of spaced radial ports communicating through an axial void to receive incoming supply gas and to emit, through a smaller orifice, outgoing gas to actuate a dump valve. When this combination is inverted and connected to work in series with a snap action pilot valve there results a non-bleeding liquid level control assembly. Thus, supply gas is input to the snap action pilot valve for throughput and further connection to the lesser diameter central orifice of the control head with return of gas from the large orifice release through a tube for return back to the discharge input of the pilot valve. A change in pressure output from the diaphragm of the pilot valve may then be utilized to operate the dump valve to dump for a predetermined period of time.

Therefore, it is an object of the present invention to provide a liquid level controller that is simple yet reliable in operation.

It is further an object of the present invention to provide a liquid level controller that can use actuating gas from the well-head yet be a non-bleeding type of control.

Finally, it is an object of the present invention to provide a reliable, long-lasting liquid level control valve for use in the field on oil and gas storage tanks of various kinds.

Other objects and advantages of the invention will be evident from the following detailed description when read in conjunction with the accompanying drawings which illustrate the invention.

DETAILED DESCRIPTION OF THE INVENTION

Figure 1:
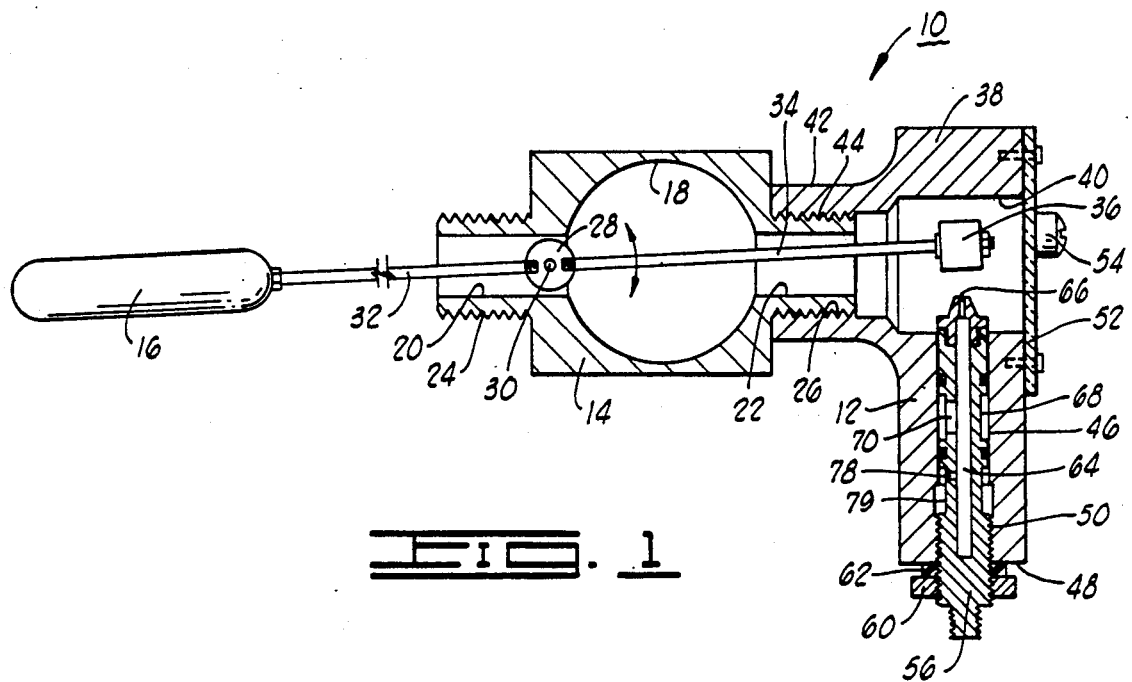
FIG. 1 is a vertical cross section of a liquid level controller constructed in accordance with the present invention.
Figure 2:
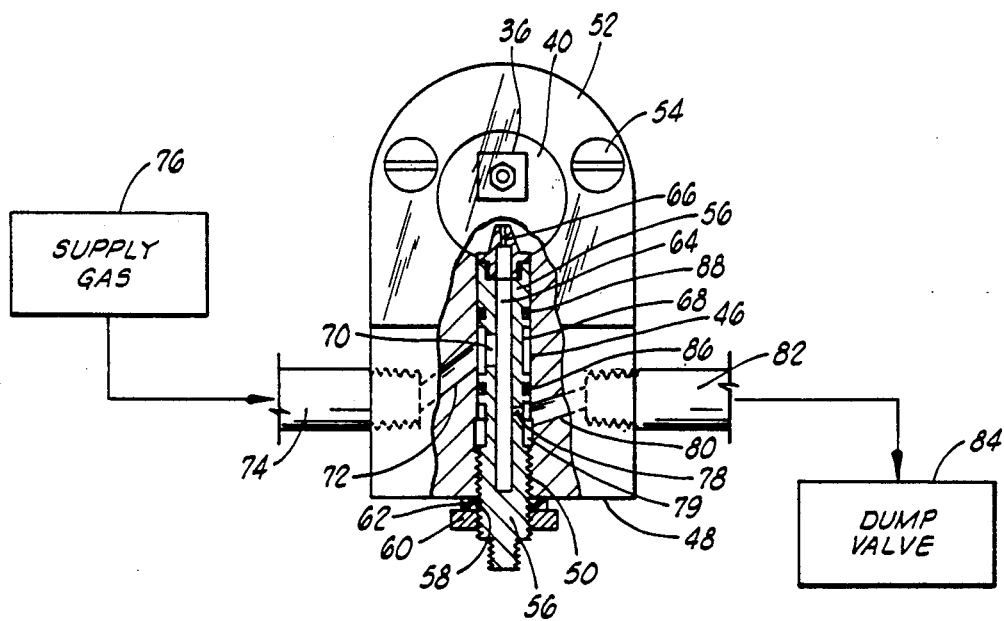
FIG. 2 is a partial block diagram showing the control head, with parts in section, of the present invention.

Referring to FIGS. 1 and 2, the liquid level sensor assembly 10 consists of a control head 12 as threadedly received on a frame 10 that supports a vertically movable float member 16. The frame 14 is formed as a generally square block of metal with a round cut out 18 formed transversely and an axially aligned pair of bores 20 and 22 having respective threads 24 and 26 on opposite sides. A spool 28 is rotatably mounted in bore 20 on spindle 30. The spool 28 is secured, as by threads, to support diametrically opposed rod sections 32 and 34. The rod section 32 threadedly receives a float member 16 thereon, and at the opposite end the rod section 34 receives a hardened rubber snubber head 36 which extends into the control head 12.

Control head 12 consists of a generally elongated block 38 having a large transverse bore 40 that is machined downward to lesser radius at neck 42 having internal threads 44. The block 38 also has an elongated bore 46 extending from the bottom surface 48 into communication with the transverse bore 40, a lower collar portion being formed to have threads 50. A transparent cover plate 52 is then secured over bore 40 by means of screws 54.

The bore 46 receives a tightly-sealed orifice post 56 upward therein. A collar portion of post 56 is externally threaded with threads 58 which are received upward within threads 50 until the orifice post 56 is properly positioned. A locking bolt 60 and sealing ring 62 secure the post 56 for operation. The orifice post 56 includes an axial void 64 extending along its length and post 56 is in communication with an upper end nozzle bore 66. A first annular relief space 68 provides a void space around the orifice post 56 and a large radial bore 70 provides communication between axial bore 64 and port 72 leading to the entry of threaded conduit 74 from supply gas source 76. A second, smaller radial bore 78 provides communication between the axial void 64 and annular relief 79 to an opposite side port 80 leading to threaded conduit 82 going to the dump valve 84. The size of radial orifices 70 and 78 is about a 4:1 ratio. The groove-seated sealing rings 86 and 88 are provided to insure sealing and isolation of the annular void spaces 68 and 79 along orifice post 56.

The liquid level controller 10 of FIGS. 1 and 2 can be employed in the attitude illustrated for intermittent control of fluids from a storage tank to a next associated stage tank. Thus, when the fluid is below level and not buoying the float 16, snubber block 36 is raised up off of nozzle orifice 66. Supply gas coming in on conduit 74 through radial bore 70 and axial bore 64 is relieved upward through nozzle orifice 66 and the controller is in a quiescent state. When the flotation of float 16 reaches upper limit, the snubber block 36 shuts off nozzle orifice 66, and supply gas from port 72 to axial void 64 is ported through radial bore 78 and port 80 to the conduit 82 connected to dump valve 84. The sudden presence of gas in conduit 82 will be of sufficient pressure to operate the dump valve 84 to dump oil or other liquid from the tank for a pre-set time period thereby to bring the liquid level back to a predetermined starting point.

Figure 3:
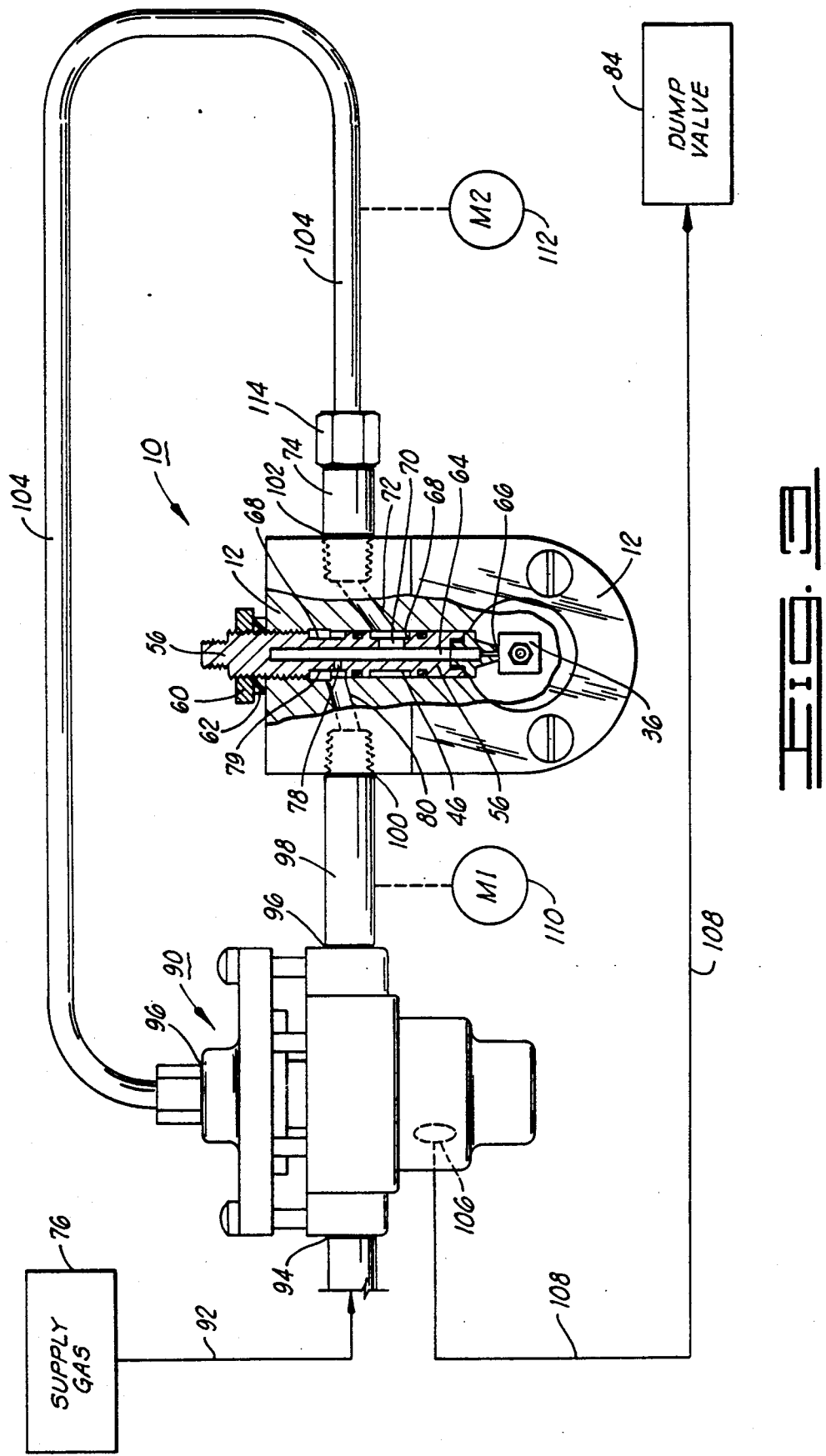
FIG. 3 is an idealized block diagram showing the inverted control head with parts in section and being connected with a pilot valve for non-bleeding operation.

Referring to FIG. 3, there is shown a liquid level sensor assembly 10 as used in conjunction with a commercially available type of snap pilot valve 90 to provide a non-bleeding type of liquid level control. The snap pilot valve 90 is a well-known type of pilot valve that is commercially available from Kimray, Inc. of Oklahoma City, Okla. Valve 90 is a type 3 PS snap pilot valve which may be used in any system where it is desired to change and reverse a varying pneumatic signal to an output signal of the same or higher pressure up to a 4:1 ratio.

FIG. 3 shows a standard installation of the type used to separate a liquid from natural gas, and that includes liquids such as oil, mineral spirits, brine, water, etc. Supply gas 76 may be obtained from the storage section of the gas process wherein dry gas is tapped from the upper extremity of storage for conduction along conduit 92 and connection to a supply inlet port 94 of pilot valve 90. Supply gas throughput is directed from supply outlet port 96 through a conduit 98 to a threaded port 100 of control head 12. Supply gas discharged after operative function is via outlet port 102 and feedback conduit 104 for connection into the variable pressure sample input 106 of pilot valve 90. Amplified pressure signal output is derived from a threaded pilot diaphragm output 106 for conduction via conduit 108 to actuate the dump valve 84 located on the process tank.

Meters 110 and 112 may be located on inlet and outlet sides of the control head 12 and these may normally be adjusted to about 20 to 30 psig. In the quiescent state, the outlet meter 112 will also register an amount similar to that at inlet meter 110. In this state, float 16 is not yet supported by an overflow condition and its weight maintains snubber head 36 urged upwardly and securely maintained above the nozzle bore 66. There is then in this condition supply pressure throughput through inlet port 72, annular relief chamber 68, large radial bore 70, axial bore 64, small radial bore 78, annular relief void 79 and outlet port 80 to outlet conduit 82.

The gas output in outlet conduit 102 is then cycled for sampling by means of a suitable reducing nipple 114 back around through conduit 104 for sealed entry into an upper sample inlet 96 into pilot valve 90. The recycling of the supply gas back into the discharge inlet 96 is a very safe and environmentally desirable routing of the gas which renders the system non-bleeding into the atmosphere. An actuation output, i.e. a gas surge or pulse, is derived at diaphragm port 106 for conduction through conduit 108 to actuate dump valve 84.

The pilot valve 90 is made up of a series of diaphragms and spring actuating means which responds to a change in supply gas input to change and reverse the varying pressure signal to an output signal of proportionately higher pressure as released by the differential diaphragm within the lower portion of pilot valve 90 for output on conduit 108 In the quiescent state, the supply gas is supplied evenly through control head 12 with pressure approximately equal on each side and constant pressure applied through conduit 104 to the discharge sample input 96 of pilot valve 90. In this condition, snubber head 36 is urged upward to maintain nozzle bore 66 tightly closed. When the liquid level rises sufficiently, the float 16 is urged upward with consequent downward movement of snubber head 36 so that pressure from axial void 64 escapes through nozzle bore 66. When this occurs, a pressure unbalance is quickly seen at sample input 96 of pilot valve 90 such that the spring/diaphragm action within valve 90 produces a pressure surge of magnified amount through diaphragm outlet 106 and conduit 108 to actuate dump valve 84 to dump its liquid load for a pre-determined time period.

The foregoing discloses a novel form of liquid level control which may be used either indoor or outdoors to monitor the liquid level of a tank system continuously. The system exhibits particular novelty due to the fact that it utilizes system supply gas for actuation yet is non-bleeding of used gas to the atmosphere thereby to avoid pollution and/or explosive danger conditions.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus consisting of a float control valve in combination with a snap-action pilot valve for control of liquid level within a liquid container by providing dump valve actuation without bleeding gas to the external surrounds, comprising:
    level sensing means supported from said container and having a vertically pivotable float secured on one end and a snubber head on the other end and extending external of said container such that upward movement of said float causes downward movement of said snubber head;

a control head secured to said level sensing means and defining a reaction space in surround of said snubber head, a central bore extending downward through the control head in communication with said space, and first and second threaded ports in opposite sides of the control head and in communication with said central bore;

an orifice post threadedly secured downward in said central bore, said orifice post having first and second annular grooves spaced therealong and an axial void extending therethrough and terminating in said reaction space adjacent said snubber head as a nozzle; and first and second transverse ports formed through the orifice post each in communication between respective first and second annular grooves and said axial void, said axial void nozzle being sealed by upward movement of said snubber head when no flotation pressure is present on said float;

a snap action pilot valve having a sample inlet, first and second supply connections, and a diaphragm outlet;

a supply gas of pre-set pressure connected for input to said second supply connection;

first conduit means connecting said first supply connection as output for connection to said control head first threaded port;

a second conduit connecting the control head second threaded port back to the pilot valve sample inlet; and third conduit means connecting the output from said diaphragm outlet to a dump valve;

whereby commencement of gas release at said nozzle reduces pressure in said second conduit means to said pilot valve sample inlet to actuate the pilot valve and produce an output pressure pulse from the diaphragm outlet to actuate the dump valve.

2. Apparatus as set forth in claim 1 which is further characterized to include:

plural sealing means along said orifice post to seal around said first and second annular grooves.

3. Apparatus as set forth in claim 1 wherein:

said snubber head is formed of pliable rubber extending a sealing facing toward the orifice post.

4. Apparatus as set forth in claim 1 which is further characterized to include:

first and second pressure indicating meters disposed in communication with respective first and second threaded ports.

5. Apparatus as set forth in claim 1 wherein:

the diameters of the first and second transverse ports are in a ratio of one to four.

* * * * *